(12) United States Patent
Shen et al.

(10) Patent No.: US 9,794,902 B2
(45) Date of Patent: Oct. 17, 2017

(54) SYNCHRONIZATION METHOD, MOBILE STATION APPARATUS AND BASE STATION APPARATUS

(71) Applicant: NTT DOCOMO, INC., Tokyo (JP)

(72) Inventors: Jiyun Shen, Tokyo (JP); Satoshi Suyama, Tokyo (JP); Yukihiko Okumura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/916,588

(22) PCT Filed: Sep. 2, 2014

(86) PCT No.: PCT/JP2014/073068
§ 371 (c)(1),
(2) Date: Mar. 4, 2016

(87) PCT Pub. No.: WO2015/033928
PCT Pub. Date: Mar. 12, 2015

(65) Prior Publication Data
US 2016/0227501 A1    Aug. 4, 2016

(30) Foreign Application Priority Data

Sep. 6, 2013    (JP) ................................ 2013-185658

(51) Int. Cl.
*H04W 56/00* (2009.01)
*H04W 16/28* (2009.01)
(Continued)

(52) U.S. Cl.
CPC ...... *H04W 56/0015* (2013.01); *H04B 7/0413* (2013.01); *H04B 7/0617* (2013.01); *H04W 16/28* (2013.01); *H04W 56/00* (2013.01)

(58) Field of Classification Search
CPC . H04W 56/0015; H04W 56/00; H04W 16/28; H04B 7/0413; H04B 7/0617
See application file for complete search history.

(56) References Cited

U.S. PATENT DOCUMENTS

2004/0082356 A1* 4/2004 Walton ................... H04B 7/022
455/522
2005/0197162 A1* 9/2005 Fujishima ............ H04B 7/0408
455/562.1
(Continued)

FOREIGN PATENT DOCUMENTS

JP      2011514761 A    5/2011
JP      2013017237 A    1/2013
(Continued)

OTHER PUBLICATIONS

International Search Report issued in corresponding application No. PCT/JP2014/073068 dated Nov. 25, 2014 (2 pages).
(Continued)

*Primary Examiner* — Vineeta Panwalkar
(74) *Attorney, Agent, or Firm* — Osha Liang LLP

(57) ABSTRACT

The present invention is designed to allow a communication system employing massive-MIMO to optimize its performance. A mobile station apparatus transmits a synchronization signal by controlling the transmission direction of the transmitting beam for the synchronization signal by means of beamforming using a plurality of antenna elements, and has a synchronization signal processing section (62) that generates the synchronization signal including identification information of the mobile station apparatus, and changes the beamforming weight for the synchronization signal at predetermined time intervals, and a transmitting section (63) that transmits the synchronization signals generated in accordance with each beamforming weight on the uplink.

10 Claims, 10 Drawing Sheets

(51) Int. Cl.
   *H04B 7/06* (2006.01)
   *H04B 7/0413* (2017.01)

(56) References Cited

U.S. PATENT DOCUMENTS

2011/0032149 A1    2/2011   Leabman
2013/0003668 A1    1/2013   Xiao et al.
2013/0028186 A1    1/2013   Kim
2013/0182594 A1    7/2013   Kim et al.
2013/0322280 A1*  12/2013   Pi .................... H04W 72/0413
                                                         370/252

FOREIGN PATENT DOCUMENTS

WO    2009114621 A2    9/2009
WO    2012149559 A1    11/2012

OTHER PUBLICATIONS

Written Opinion of the International Searching Authority issued in corresponding application No. PCT/JP2014/073068 dated Nov. 25, 2014 (3 pages).
3GPP TR 25.913 V9.0.0, "3rd Generation Partnership Project; Technical Specification Group Radio Access Network; Requirements for Evolved UTRA (E-UTRA) and Evolved UTRAN (E-UTRAN) (Release 9)"; Dec. 2009 (18 pages).
Extended European Search Report issued in the counterpart European Patent Application No. 14842126.6, mailed Mar. 23, 2017 (7 pages).

* cited by examiner

SYNCHRONIZATION METHOD, MOBILE STATION APPARATUS AND BASE STATION APPARATUS

TECHNICAL FIELD

The present invention relates to a synchronization method, a mobile station apparatus and a base station apparatus in a next-generation mobile communication system.

BACKGROUND ART

In a UMTS (Universal Mobile Telecommunications System) network, long term evolution (LTE) is under study for the purpose of further increasing high speed data rates, providing lower delay and so on (see non-patent literature 1). Also, successor systems of LTE (referred to as, for example, "LTE-advanced" or "LTE enhancement" (hereinafter referred to as "LTE-A")) are under study for the purpose of achieving further broadbandization and increased speed beyond LTE.

In these LTE and LTE-A, when a mobile station apparatus UE communicates with the network, a cell search process is required to establish synchronization. In the cell search process, the mobile station apparatus UE detects the synchronization signal (SS: Synchronization Signal) that is transmitted from the base station apparatus at regular time intervals, and acquires frequency synchronization, timing synchronization and the cell ID (PCI: Physical Cell ID) of the cell where the mobile station apparatus UE is located (serving cell). Based on the information acquired, the mobile station apparatus UE determines the serving cell. Note that the synchronization signal includes identification information to identify the base station apparatus (for example, a base station ID), so that the mobile station apparatus UE can specify the connecting base station apparatus based on this identification information. Then, by transmitting the RACH (Random Access CHannel) to the specified base station apparatus, the mobile station apparatus UE can report its presence to the cell and secure communication resources.

CITATION LIST

Non-Patent Literature

Non-Patent Literature 1: 3GPP TR 25.913 "Requirements for Evolved UTRA and Evolved UTRAN"

SUMMARY OF INVENTION

Technical Problem

Now, in LTE-A and later mobile communication systems, for example, the use of MIMO (Massive MIMO (Multi Input Multi Output)), which uses a large number of miniaturized antenna elements in a high frequency band (hereinafter referred to as "massive-MIMO" whenever appropriate), is under study. Also, by using many antenna elements as in massive-MIMO, it becomes possible to realize even more reliable beamforming.

Here, "beamforming" refers to the technique of allowing transmitting/receiving beams to have directivity and changing the shape of beams by controlling the amplitude and phase of each transmitting/receiving signal in a plurality of antenna elements. In this beamforming, generally, a larger number of antenna elements allow more reliable control. In other words, it is possible to control, in detail, the number of beams, the shape of each beam (the beam width in the horizontal plane, the beam width in the vertical plane and so on, hereinafter referred to as "beam width" whenever appropriate) and the direction and gain of beams, depending on the number of antenna elements. For example, high gain (power density) can be achieved by narrowing the width of beams (that is, by forming thin beams).

To allow a communication system like this employing massive-MIMO to optimize its performance, it is necessary to make sure to transmit synchronization signals to mobile station apparatuses UE, and conduct the cell search process in the mobile station apparatuses UE adequately. However, given the present structures, the situation is likely where the cell search process cannot be executed adequately on the mobile station apparatus UE side, and therefore it is not possible to optimize the performance of communication systems.

The present invention has been made in view of the above, and it is therefore an object of the present invention to provide a synchronization method, a mobile station apparatus and a base station apparatus, which can allow a communication system employing massive-MIMO to optimize its performance.

Solution to Problem

The synchronization method of the present invention provides a synchronization method for transmitting a synchronization signal by controlling a transmission direction of a transmitting beam for the synchronization signal by means of beamforming using a plurality of antenna elements provided in a mobile station apparatus, and this synchronization method includes a synchronization signal processing step of generating the synchronization signal including identification information of the mobile station apparatus, and changing a beamforming weight for the synchronization signal at predetermined time intervals, and a transmitting step of transmitting the synchronization signals generated in accordance with each beamforming weight on uplink.

The mobile station apparatus of the present invention provides a mobile station apparatus that transmits a synchronization signal by controlling a transmission direction of a transmitting beam for the synchronization signal by means of beamforming using a plurality of antenna elements, and this mobile station apparatus has a synchronization signal processing section that generates the synchronization signal including identification information of the mobile station apparatus, and changes a beamforming weight for the synchronization signal at predetermined time intervals, and a transmitting section that transmits the synchronization signals generated in accordance with each beamforming weight on uplink.

The base station apparatus of the present invention provides a base station apparatus that transmits a transmitting signal by controlling a transmission direction of a transmitting beam by means of beamforming using a plurality of antenna elements, and this base station apparatus has a receiving section that receives a synchronization signal including identification information of a mobile station apparatus, an acquiring section that acquires terminal information, including the identification information of the mobile station apparatus, from the synchronization signal, and a transmitting signal processing section that controls the transmission direction of the transmitting signal by using a beamforming weight to match the terminal information.

Advantageous Effects of Invention

According to the present invention, it is possible to provide a synchronization method, a mobile station apparatus and a base station apparatus, which can allow a communication system employing massive-MIMO to optimize its performance.

DESCRIPTION OF EMBODIMENTS

Now, an embodiment of the present invention will be described below in detail with reference to the accompanying drawings. First, a summary of the massive-MIMO transmission scheme that is employed in the synchronization method according to the present embodiment will be described. The massive-MIMO transmission scheme achieves improved data rates (spectral efficiency) by, for example, transmitting data by using 100 or more antenna elements. Since data is transmitted using 100 or more antenna elements, it becomes possible to improve the efficiency of transmission by virtue of multiplexing compared to when using a small number of antenna elements, and faster radio communication than heretofore becomes possible. Also, since there are a more diverse range of options for combining antenna elements when beamforming is executed, more reliable beamforming than heretofore becomes possible. By means of such reliable beamforming, the effects of increasing received signal power by virtue of beamforming gain, reducing interference and making effective use of radio resources may be anticipated.

Also, in the massive-MIMO transmission scheme, for example, it is possible to use a high frequency band such as 10 GHz or higher adequately. Generally, the size of antenna elements is proportional to the wavelength of transmitting signals. In a high frequency band, the wavelength of transmitting signals is relatively short, so that the antenna element size can be made small. Consequently, this is favorable for the massive-MIMO transmission scheme which provides a large number of antenna elements. Also, the rate of the use of high frequency bands is low compared to that of low frequency bands, so that it is possible easily to secure resources over a wide bandwidth. Meanwhile, propagation loss increases in signal transmission using a high frequency band. Consequently, when signals are transmitted with the same transmission power, the intensity of received signals in a mobile station apparatus UE may lower compared to that in signal transmission using a low frequency band. Nevertheless, this decrease of received signal intensity can be covered up by beamforming gain.

Figure 1B:
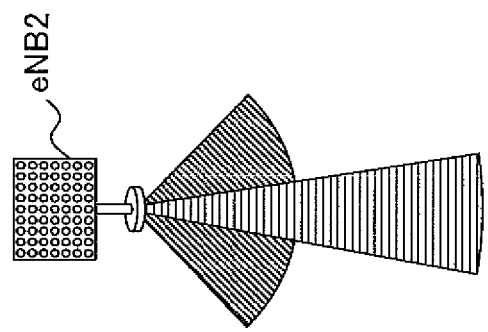
FIG. 1 shows a diagram to explain a transmitting beam coverage in a base station apparatus where massive-MIMO is employed.
Figure 1A:
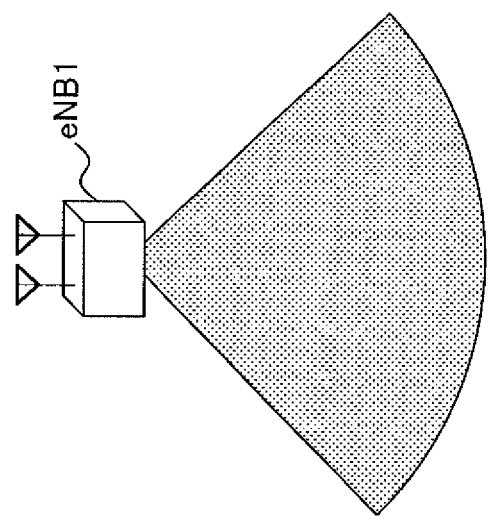

Now, the coverage of transmitting beams in a base station apparatus employing the massive-MIMO transmission scheme (hereinafter referred to as the "massive-MIMO base station") will be described. FIG. 1 provides a diagram to explain the coverage of transmitting beams in a massive-MIMO base station. FIG. 1A shows the coverage of a transmitting beam that is output from a general base station apparatus (base station apparatus which does not employ massive-MIMO), and FIG. 1B shows the coverages of transmitting beams that are output from a massive-MIMO base station. Note that a case is illustrated here where the massive-MIMO base station shown in FIG. 1B transmits signals using a high frequency band, and where the base station apparatus shown in FIG. 1A transmits signals using a low frequency band.

Since signals are transmitted using a low frequency band in the general base station apparatus eNB1 shown in FIG. 1A, even when a transmitting beam of a wide beam width (transmitting beam to stretch over a wide range) is formed, the transmitting beam travels a long distance. Meanwhile, in the massive-MIMO base station eNB2 shown in FIG. 1B, when a transmitting beam of a wide beam width is formed, the transmitting beam cannot travel a long distance due to the propagation characteristics in a high frequency band. By contrast with this, when a transmitting beam of a narrow beam width (a transmitting beam to stretch over a narrow range (local range)) is formed, the transmitting beam can travel a long distance. Consequently, the massive-MIMO base station, preferably, learns the location (the direction and distance) of a mobile station apparatus UE of the transmission target, and transmits user data by forming a transmitting beam having a directivity to that location by way of beamforming.

When radio communication is carried out with a massive-MIMO base station like this, a mobile station apparatus UE needs to carry out a cell search process in order to establish synchronization as in LTE and LTE-A. However, if the synchronization signal (SS: Synchronization Signal) is transmitted from the massive-MIMO base station without beamforming while the mobile station apparatus UE is present in a distant location from the massive-MIMO base station, the received power of the synchronization signal lowers, and the situation might occur where the cell search process cannot be performed adequately.

To cope with this situation, it may be possible to apply beamforming to the synchronization signal to use in cell search and transmit the resulting signal. In this way, by applying beamforming to the synchronization signal, it is possible to allow the synchronization signal to travel to a long distance location from the massive-MIMO base station. By this means, it is possible to carry out the cell search process adequately in the mobile station apparatus UE.

This way of taking a measure by transmitting a synchronization signal that has been subjected to beamforming transmitted from the massive-MIMO base station is effective when the massive-MIMO base station has identification information such as a base station ID. However, when the massive-MIMO base station does not have identification information such as a base station ID, the mobile station apparatus UE cannot specify the connecting base station (massive-MIMO base station) from the synchronization signal, and cannot perform the cell search process adequately. Given this background, a defect in the cell search process arises in an environment where the premise is held that the cell search process is carried out in mobile station apparatuses UE based on synchronization signals from the massive-MIMO base station. The present inventors have focused upon the fact that defect in the cell search process resulting from the above-described background and so on can be solved by transmitting a synchronization signal from a mobile station apparatus UE and carrying out a synchronization process in a massive-MIMO base station based on this synchronization signal, and thereupon arrived at the present invention.

That is, a gist of the present invention is, in a synchronization method for transmitting a synchronization signal by controlling the transmission direction of the transmitting beam of the synchronization signal by way of beamforming using a plurality of antenna elements provided in a mobile station apparatus UE, to generate a synchronization signal including identification information of the mobile station apparatus UE, and, furthermore, change the beamforming weight for the synchronization signal at predetermined time intervals, and transmit synchronization signals that are generated in accordance with each beamforming weight, on the uplink.

With the synchronization method according to the present invention, a mobile station apparatus UE generates and transmits synchronization signals by changing the beamforming weight every predetermined time interval, so that it is possible to allow the synchronization signals to travel to a massive-MIMO base station that is located at a long distance from the mobile station apparatus UE. Meanwhile, since the synchronization signals include identification information of the mobile station apparatus UE, the massive-MIMO base station can specify information related to the mobile station apparatus UE being the sender. By this means, the synchronization process can be performed adequately in the massive-MIMO base station, so that it is possible to solve the defect in the cell search process that occurs due to the fact that the massive-MIMO base station has no base station ID.

Figure 2:
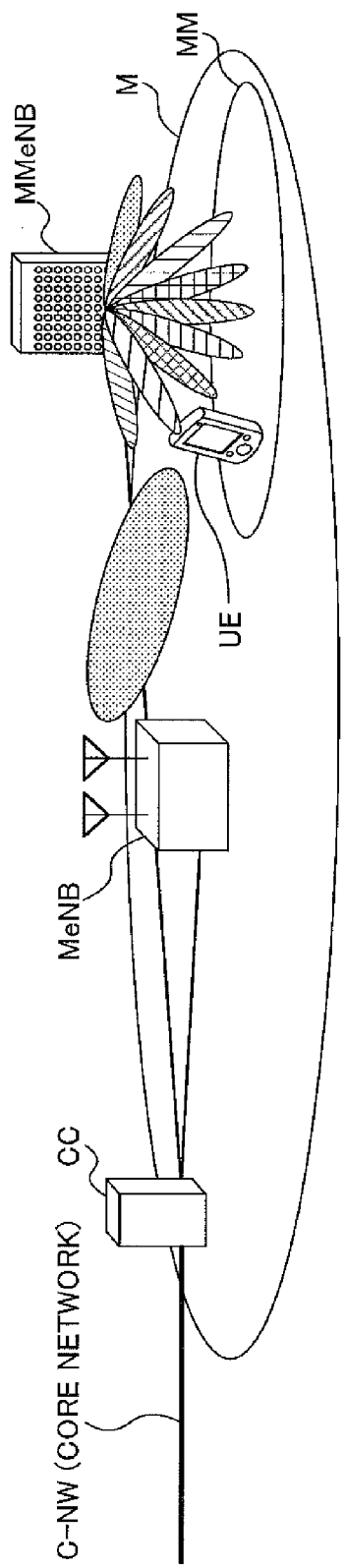
FIG. 2 is a diagram to show an example network structure where the synchronization method according to the present embodiment is employed.

Now, the network structure to employ the synchronization method according to the present embodiment will be described. FIG. 2 is a diagram to show an example network structure in which the synchronization method according to the present embodiment is employed. FIG. 2 shows a case of application to a network structure (for example, a heterogeneous network), in which a massive-MIMO base station overlays the massive-MIMO cell MM in the cell area of a macro cell M. However, the network structure in which the synchronization method according to the present embodiment is employed is not limited to overlay networks, and can be changed as appropriate.

In the network structure shown in FIG. 2 where the massive-MIMO cell MM overlays (hereinafter referred to as an "overlay network" whenever appropriate), the base station apparatus to form the macro cell M (hereinafter referred to as the "macro base station" whenever appropriate) MeNB and the base station apparatus to form the massive-MIMO cell MM (hereinafter referred to as "massive-MIMO base station (MM base station)" whenever appropriate) MMeNB are connected with a central control station CC that is deployed in the macro cell M. This central control station CC is connected to a core network C-NW. Note that the central control station CC may be, for example, an access gateway apparatus, a radio network controller (RNC), a mobility management entity (MME) and so on, but is by no means limited to these.

Also, in the overlay network structure shown in FIG. 2, for example, the control plane (C (Control)-plane) to handle control messages is supported by the macro cell M. On the other hand, the user plane (U (User)-plane) to handle user data is supported by the massive-MIMO cell MM. Also, in the overlay network structure shown in FIG. 2, the macro cell M and the massive-MIMO cell MM can be operated in different frequency bands. For example, it is possible to operate the C-plane supported by the macro cell M in the 2 GHz band, and operate the U-plane supported by the massive-MIMO cell MM in the 10 GHz band.

For example, when the massive-MIMO cell MM operates in the 10 GHz band, the MM base station MMeNB and a mobile station apparatus (hereinafter referred to simply as a "mobile station") UE are often connected via a line-of-sight (LoS) where there is no obstacle. In a communication environment where such a line-of-sight connection is held, generally, a propagation path with little frequency selectivity is formed.

The overlay network structure shown in FIG. 2 illustrates a case where the MM base station MMeNB is placed to overlap the macro cell M. However, the target that the MM base station MMeNB according to the present embodiment overlaps is not limited to this. For example, like the macro cell M, it is equally possible to place the MM base station MMeNB according to the present embodiment to overlap a wireless LAN (Local Area Network) or a cable LAN that covers a wide range. Also, it is not always necessary to place the MM base station MMeNB according to the present embodiment to overlap other radio base stations or networks.

In the overlay network structure shown in FIG. 2, the MM base station MMeNB can transmit signals to the mobile station UE located in the massive-MIMO cell MM by using the massive-MIMO transmission scheme. To be more specific, by controlling the amplitude and phase of each signal in a plurality of antenna elements, the MM base station MMeNB can form transmitting beams with a directivity to the mobile station UE (beamforming) and transmit signals.

Note that, in a communication environment in which support for the C-plane and the U-plane is separated between a macro cell M and a massive-MIMO cell MM as in the overlay network structure shown in FIG. 2, for example, control information that is necessary to receive user data from the macro base station MeNB can be transmitted to a mobile station UE, while user data can be transmitted from the MM base station MMeNB. Also, it is equally possible to transmits part of the control information from the macro base station MeNB, while transmitting the rest of the control information and user data from the MM base station MMeNB.

The mobile station UE is structured to be capable of communicating with the macro base station MeNB when located in the macro cell M, and communicating with the MM base station MMeNB, in addition to the macro base station MeNB, when located in the massive-MIMO cell MM. Note that, although the mobile station UE will be described to carry out radio communication with the macro base station MeNB and the MM base station MMeNB for ease of explanation, more generally, this can be a user apparatus (UE: User Equipment) which may be either a mobile terminal apparatus or a stationary terminal apparatus.

The mobile station UE has multiple (for example, 16) antenna elements. The mobile station UE is structured to be capable of applying beamforming to transmitting signals and receiving signals by using these antenna elements. That is, the mobile station UE can change the directivity of transmitting beams and receiving beams, the shape of beams and so on, by controlling the amplitude and phase of every transmitting and receiving signal in these antenna elements.

As will be described in detail later, the mobile station UE is structured to be capable of transmitting a connection request signal for requesting connecting with the MM base station MMeNB, to the macro base station MeNB. For example, the mobile station UE transmits the connection request signal to the macro base station MeNB when high speed communication becomes necessary. Also, the mobile station UE is structured to be capable of receiving control information in response to this connection request signal from the macro base station MeNB. This control information includes an indication as to whether or not there is an MM base station MMeNB near the mobile station UE that transmitted the connection request signal, its location information and so on.

Also, the mobile station UE is structured to be capable of transmitting a synchronization signal (hereinafter referred to as the "UE synchronization signal" whenever appropriate) that includes terminal-specific identification information (for example, a UE-ID), near the subject station, by employing beamforming. This UE synchronization signal is transmitted so as to establish synchronization with MM base stations MMeNB located near the subject station. For example, if the control information received from the macro base station MeNB indicates that an MM base station MMeNB is present near the subject station, the mobile station UE transmits the UE synchronization signal.

Figure 3:
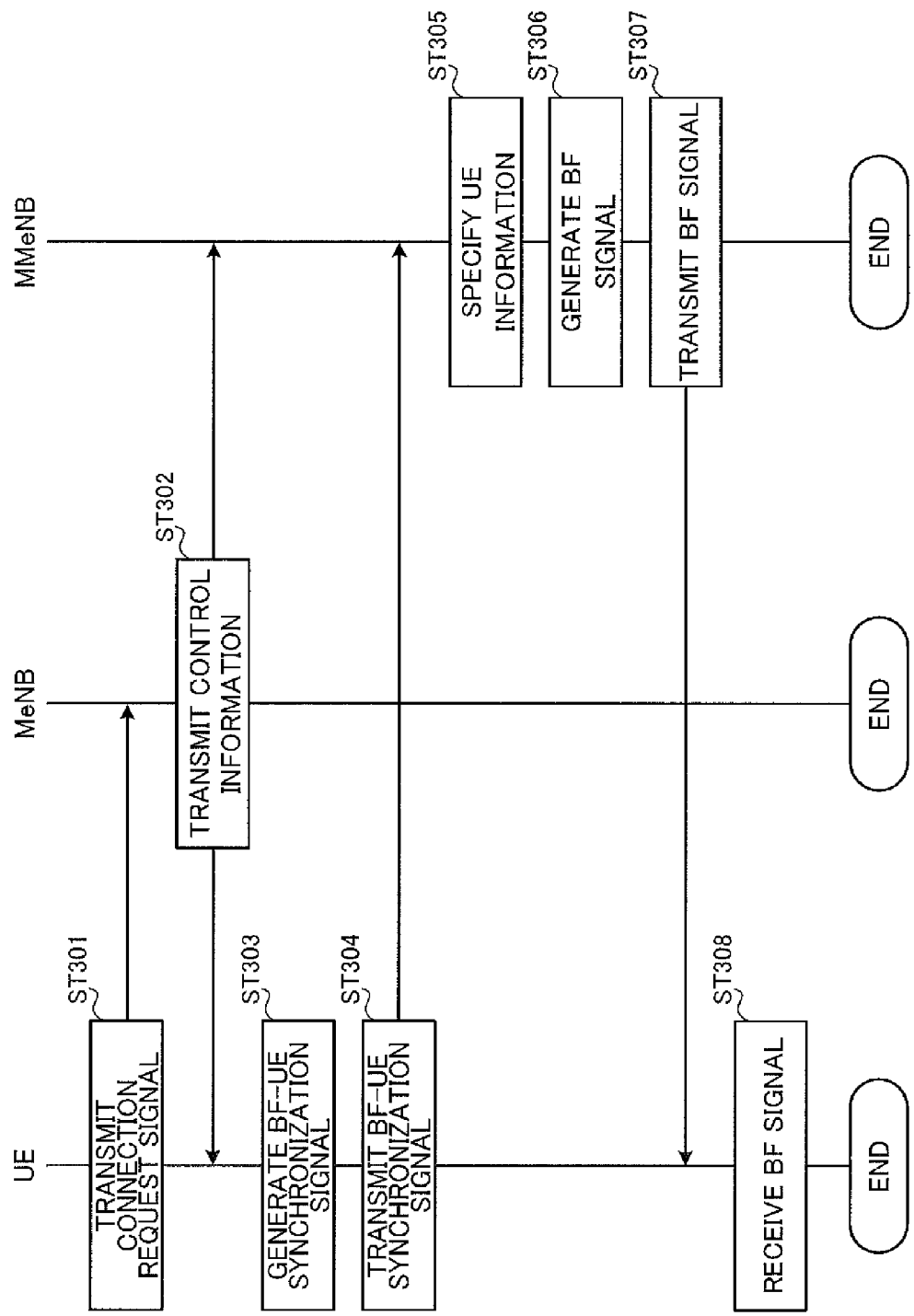
FIG. 3 is a diagram to explain an example of the operation sequence among a mobile station apparatus, a macro base station apparatus and a massive-MIMO base station apparatus in the synchronization method according to the present embodiment.

Here, a summary of the operation sequence of a mobile station UE, a macro base station MeNB and an MM base station MMeNB according to the synchronization method of the present embodiment will be described. FIG. 3 is a diagram to explain an example of the operation sequence of a mobile station UE, a macro base station MeNB and an MM base station MMeNB according to the synchronization method of the present embodiment. Note that a case will be shown in the following description where high speed communication is required in the mobile station UE. Also, assume that the mobile station UE is located in the macro cell M formed by the macro base station MeNB and the massive-MIMO cell MM formed by the MM base station MMeNB, and that communication with the macro base station MeNB is established.

When high speed communication becomes necessary in the mobile station UE, as shown in FIG. 3, the mobile station UE transmits a connection request signal to the macro base station MeNB in order to communicate with the MM base station MMeNB near the subject station (step (hereinafter referred to as "ST") 301). This connection request signal includes the UE-ID as the mobile station UE's identification information. Note that the identification information of the mobile station UE to be included in the connection request signal is not limited to the UE-ID, and can be changed as appropriate. Note that the macro base station MeNB constitutes a communication apparatus that manages control information, including whether or not there is an MM base station MMeNB located near the mobile station UE. Also, the macro base station MeNB constitutes a communication apparatus that manages control information, including location information of a mobile station UE that is located near the MM base station MMeNB.

Upon receiving the connection request signal from the mobile station UE, the macro base station MeNB transmits control information to both the mobile station UE and the MM base station MMeNB (ST302). The control information for the mobile station UE (hereinafter referred to as "mobile station control information" whenever appropriate) includes information related to MM base stations MMeNB near the mobile station UE. For example, information as to whether or not there are MM base stations MMeNB near the mobile station UE, location information of the MM base stations MMeNB and/or others are included. Meanwhile, the control information for the MM base station MMeNB (hereinafter referred to as "MM base station control information" whenever appropriate) includes information related to mobile stations UE that desire communication. For example, information as to whether or not there are mobile stations UE that desire communication, UE-IDs, location information and so on are included.

After transmitting the connection request signal, the mobile station UE monitors the receipt of mobile station control information from the macro base station MeNB. Upon receiving mobile station control information, the mobile station UE applies beamforming to the UE synchronization signal including the UE-ID, and generates a BF-UE synchronization signal (ST303). Then, the mobile station UE transmits the generated BF-UE synchronization signal near the subject station (ST304). Note that the generation and transmission of this BF-UE synchronization signal will be described later in detail.

After receiving the MM base station control information, the MM base station MMeNB monitors the receipt of the BF-UE synchronization signal from the mobile station UE. Upon receiving the BF-UE synchronization signal, the MM base station MMeNB specifies information related to the mobile station UE (UE information) from this BF-UE synchronization signal (ST305). To be more specific, the MM base station MMeNB specifies the UE-ID and location information being the identification information of the mobile station UE having transmitted the BF-UE synchronization signal.

Upon specifying the mobile station UE's UE-ID and location information, the MM base station MMeNB applies beamforming to a transmitting signal for this mobile station UE and generates a BF signal (ST306). Then, the MM base station MMeNB transmits the generated BF signal to the mobile station UE (ST307). Note that this BF signal is generated by adding a beamforming weight (BF weight) based on the mobile station UE's location information, to a transmitting signal.

After transmitting the BF-UE synchronization signal, the mobile station UE monitors the receipt of the BF signal from the MM base station MMeNB. Upon receiving the BF signal (ST308), the mobile station UE monitors the completion of receipt of the BF signal. Then, when the receipt of the BF signal is complete, the mobile station UE finishes communicating with the MM base station MMeNB.

Here, the BF-UE synchronization signal that is transmitted from the mobile station UE in the synchronization method according to the present embodiment will be described. As described earlier, the mobile station UE generates the BF-UE synchronization signal by applying beamforming to the UE synchronization signal including the UE-ID, and transmits this BF-UE synchronization signal near the subject station. Meanwhile, since the BF-UE synchronization signal includes the mobile station UE's UE-ID, the MM base station MMeNB can specify information related to the mobile station UE being the sender. By this means, the synchronization process can be carried out adequately in the MM base station MMeNB, so that it is possible to solve defect in the cell search process and so on due to the fact that the MM base station MMeNB has no base station ID.

Now, a plurality of examples of the BF-UE synchronization signal transmission method in the mobile station UE where the synchronization method according to the present embodiment is employed will be described below.

First Example

Figure 4A:
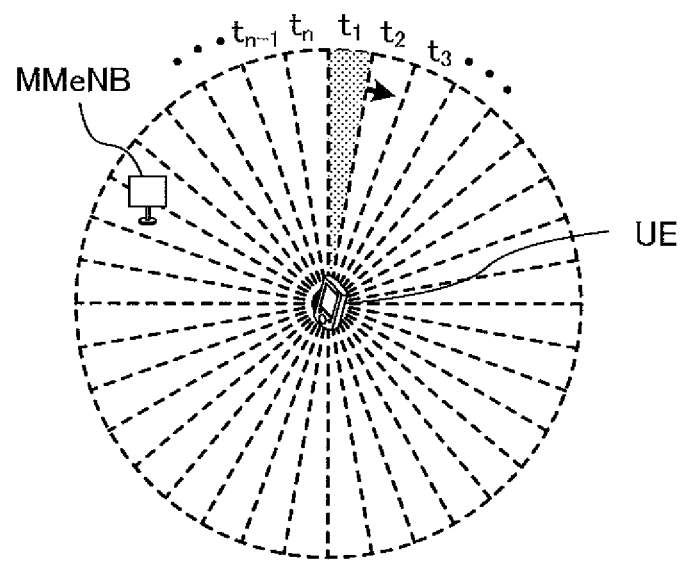
FIG. 4 provides diagrams to explain a BF-UE synchronization signal transmission method according to a first example.
Figure 4B:
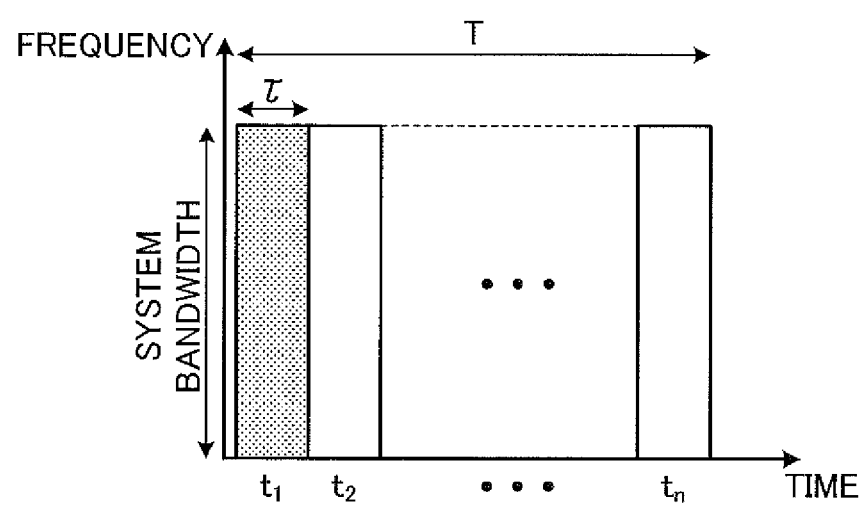

First, the BF-UE synchronization signal transmission method according to a first example will be described. FIG. 4 provides diagrams to explain the BF-UE synchronization signal transmission method according to the first example. FIG. 4A shows a schematic image of transmission of BF-UE synchronization signals from a mobile station UE near the subject station. FIG. 4B shows the BF-UE synchronization signals that are transmitted from the mobile station UE, on the time axis and on the frequency axis.

With the BF-UE synchronization signal transmission method according to the first example, as shown in FIG. 4, a transmitting beam of a narrow beam width (hereinafter abbreviated as a "narrow beam") is generated to transmit the BF-UE synchronization signal. Then, by changing the transmission direction of this narrow beam along azimuthal directions every time interval τ, the BF-UE synchronization signal is transmitted in all directions around the subject station in a predetermined total time T. That is, the BF-UE synchronization signal transmission method according to the first example is a method to scan all the MM base stations MMeNB located around a mobile station UE by changing the transmission direction of the narrow beam for transmitting the BF-UE synchronization signal in azimuthal directions every time interval τ.

For example, with the BF-UE synchronization signal transmission method according to the first example, after the narrow beam is transmitted in a certain direction around the mobile station UE at a timing $t_1$, at a timing $t_2$, the narrow beam is transmitted by shifting the transmission direction through the beam width Φ in an azimuthal direction (see FIG. 4A). Likewise, the narrow beam repeats being transmitted by changing the transmission direction through the beam width Φ along azimuthal directions every time interval τ. At a timing $t_n$, the narrow beam is transmitted in a direction to neighbor that of the narrow beam at the timing $t_1$, so that it is possible to scan all directions around the mobile station UE. Note that the BF-UE synchronization signals that are transmitted at time intervals τ can be transmitted by using the whole system bandwidth of the communication system (see FIG. 4B).

With the BF-UE synchronization signal transmission method according to the first example, the BF-UE synchronization signal S(t) can be determined by, for example, following equation 1:

$$S(t)=W_n(t,f) \cdot S_{SS}(t)$$ (Equation 1)

Here, $W_n(t,f)$ is the beamforming weight (hereinafter referred to as "BF weight"), and $S_{SS}(t)$ is the UE synchronization signal.

Also, with the BF-UE synchronization signal transmission method according to the first example, the total time T it takes to transmit the BF-UE synchronization signal in all directions around a mobile station UE can be determined by, for example, following equation 2:

$$T=360\tau/\Phi$$ (Equation 2)

Here, τ is the time interval of the BF-UE synchronization signal, and Φ is the beam width of the BF-UE synchronization signal.

Note that, with the BF-UE synchronization signal transmission method according to the first example, the time interval τ and the beam width Φ can be configured as parameters to be selected in the communication system. For example, the time interval τ can be determined based on the signal duration of the UE synchronization signal. It is possible to make the time interval τ long when the UE synchronization signal has a long signal duration, and make the time interval τ short when the UE synchronization signal has a short signal duration. Also, the beam width Φ can be determined based on the number of antenna elements, the transmission power, the frequency band, the bandwidth and the total time T. It is possible to narrow the beam width Φ when the number of antenna elements is large, while widening the beam width Φ when the number of antenna elements is small. The beam width Φ can be widened when the transmission power is high, while narrowing the beam width Φ when the transmission power is low. The beam width Φ can be narrowed when the frequency band is high, while widening the beam width Φ when the frequency band is low. The beam width Φ can be narrowed when the bandwidth is wide, while widening the beam width Φ when the bandwidth is narrow. The beam width Φ can be narrowed when the total time T is long, while widening the beam width Φ when the total time T is short.

Also, the time interval τ and the beam width Φ may also be determined in accordance with predetermined contents. Furthermore, the time interval τ and the beam width Φ may be calculated adaptively depending on the communication environment. The communication environment may concern, for example, the relative locations of MM base stations that are located around a mobile station UE and the mobile station UE (the distance to the MMeNB, the directions of the MM base stations, etc.), the number of these MM base stations MMeNB, and so on. Note that this information about the communication environment can be acquired from, for example, the macro base station MeNB.

In this way, with the BF-UE synchronization signal transmission method according to the first example, the BF-UE synchronization signal is generated and transmitted by changing the beamforming weight every time interval τ, so that it is possible to allow the UE synchronization signal to travel to a massive-MIMO base station MMeNB that is located at a long distance from a mobile station UE. Meanwhile, since the BF-UE synchronization signal includes a UE-ID that is specific to the mobile station UE, the MM base station MMeNB can specify information related to the mobile station UE being the sender. By this means, the synchronization process can be carried out adequately in the MM base station MMeNB, so that it is possible to solve the defect in the cell search process and so on that arise from the fact that the MM base station MMeNB has no cell ID.

Note that, regarding the generation of the BF-UE synchronization signal with the first example, it would make a preferable embodiment to generate BF weights to correspond to various beam directions and beam shapes (widths) in advance and store the generated BF weights in a mobile station UE, and execute beamforming by only selecting BF weights based on the beam direction, width and so on. In this case, the process of generating BF weights based on the beam direction and width can be omitted, so that it is possible to reduce the load of BF-UE synchronization signal generation in the mobile station UE.

Second Example

Next, the BF-UE synchronization signal transmission method according to a second example will be described. The BF-UE synchronization signal transmission method according to the second example is different from the BF-UE synchronization signal transmission method according to the first example in that elevation directions are added to the transmission directions of the barrow beam for transmitting the BF-UE synchronization signal. That is, the BF-UE synchronization signal transmission method according to the second example is a transmission method to scan all the MM base stations MMeNB that are located in all directions around a mobile station UE, by changing the transmission direction of the barrow beam for transmitting the BF-UE synchronization signal in azimuthal directions and in elevation directions every time interval τ. In the following description, differences from the BF-UE synchronization signal transmission method according to the first example will be primarily explained. Note that an "elevation direction" herein is orthogonal to a horizontal direction, and is defined as directions represented by angles where the angle to show the direction to go downward (or upward) is 0° C. and the angle to represent the horizontal direction is 90°.

Figure 5A:
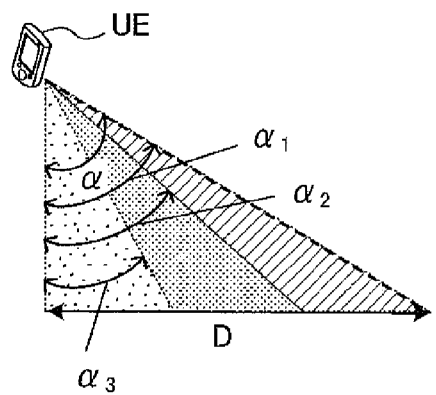
FIG. 5 provides diagrams to explain a BF-UE synchronization signal transmission method according to a second example.
Figure 5B:
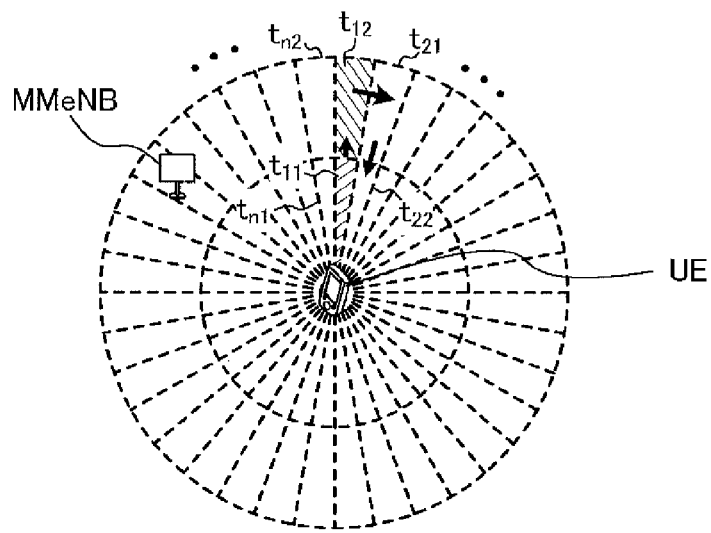
Figure 5C:
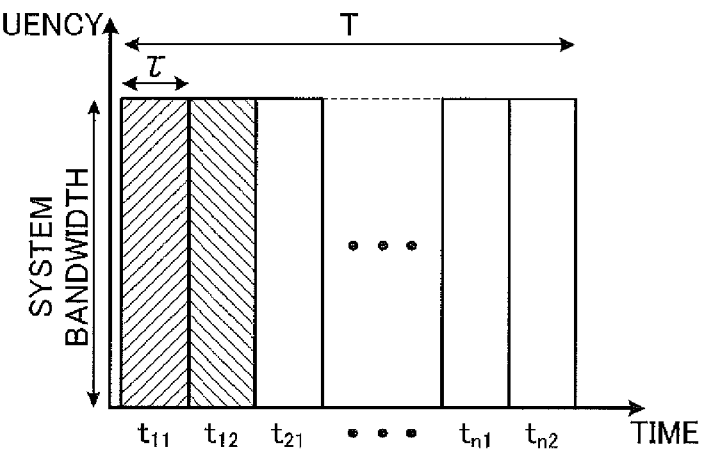

FIG. 5 provides diagrams to explain the BF-UE synchronization signal transmission method according to the second example. FIG. 5A is a diagram to explain elevation directions of BF-UE synchronization signals transmitted from a mobile station UE. FIG. 5B shows a schematic image of transmission of BF-UE synchronization signals that are transmitted from the mobile station UE near the subject station. FIG. 5C shows the BF-UE synchronization signals transmitted from the mobile station UE on the time axis and on the frequency axis.

The BF-UE synchronization signal transmission method according to the second example presumes that the mobile station UE is situated in a location off the ground. For example, as shown in FIG. 5A, a mobile station UE for use in the BF-UE synchronization signal transmission method according to the second example is placed in a location where the transmitting beam has an angle α in an elevation direction, with respect to a location a certain distance D away from the subject station on the ground. For example, as shown in FIG. 5A, a mobile station UE for use in the BF-UE synchronization signal transmission method according to the second example can transmit BF-UE synchronization signals to three areas located around the subject station by generating a transmitting beam having an angle $\alpha_1$ in an elevation direction, a transmitting beam having an angle $\alpha_2$ in an elevation direction and a transmitting beam having an angle $\alpha_3$ in an elevation direction.

The BF-UE synchronization signal transmission method according to the second example is different from the BF-UE synchronization signal transmission method according to the first example in that, as shown in FIG. 5B and FIG. 5C, transmitting beams that vary in the radial direction of an area of a circular shape around a mobile station UE (hereinafter referred to as the "circular area" whenever appropriate) are generated. Note that the transmitting beams that vary in the radial direction of the circular area around the mobile station UE are generated by, for example, a beamforming technique to provide vertical directivity (3D beamforming).

Note that, for ease of explanation, FIG. 5B and FIG. 5C will be described assuming that the beam width Φ of the transmitting beams in the radial direction of the circular area around the mobile station UE has a length half the radius of the circular area. That is, a case will be described with FIG. 5B and FIG. 5C where two transmitting beams that vary in the radial direction of a circular area around a mobile station UE are generated. However, the number of transmitting beams to be generated in the radial direction of the circular area around the mobile station UE is not limited to this, and can be changed as appropriate.

For example, with the BF-UE synchronization signal transmission method according to the second example, after the narrow beam is transmitted at a timing $t_{11}$ in a certain direction in the inner part of a circular area around a mobile station UE, at a timing $t_{12}$, the narrow beam is transmitted by shifting the transmission direction in an elevation direction through the beam width Φ in the outer part (see FIG. 5B). Furthermore, after the narrow beam is transmitted at a timing $t_{21}$ by shifting the transmission direction in an azimuthal direction through the beam width Φ, at a timing $t_{22}$, the narrow beam is transmitted by shifting the transmission direction in an elevation direction through the beam width Φ, in the inner part (see FIG. 5B). Likewise, the narrow beam keeps being transmitted by shifting the transmission direction in elevation directions and azimuthal directions, through the beam width Φ, every time interval τ. At timings $t_{n1}$ and $t_{n2}$, by transmitting narrow beams in directions to neighbor those of the narrow beams at the timings $t_{11}$ and $t_{12}$, it is possible to scan all directions around the mobile station UE.

Note that, with the BF-UE synchronization signal transmission method according to the second example, the BF-UE synchronization signal S(t) can be determined by, for example, the above-noted equation 1. Meanwhile, in the BF-UE synchronization signal transmission method according to the second example, the total time T it takes to transmit the BF-UE synchronization signal in all directions around a mobile station UE can be determined by, for example, following equation 3:

$$T = 360 \alpha \tau / \Phi^2 \qquad \text{(Equation 3)}$$

Here, τ is the time interval of the BF-UE synchronization signal, α is the maximum elevation angle of the transmitting beam, and Φ is the beam width of the BF-UE synchronization signal.

Also, similar to the first example, with the BF-UE synchronization signal transmission method according to the second example, the time interval τ and the beam width Φ can be configured as parameters to be selected in the communication system. Furthermore, as in the first example, the time interval τ and the beam width Φ may also be determined in accordance with predetermined contents, or may be calculated adaptively depending on the communication environment.

Note that, although an example has been described here where the beam width in the horizontal plane (horizontal beam width) and the beam width in the vertical plane (vertical beam width) are the same beam width Φ, it is also possible to configure the horizontal beam width and the vertical beam width to be different values. In this case, the total time T it takes to transmit the BF-UE synchronization signal in all directions around a mobile station UE can be determined by, for example, following equation 4:

$$T = 360\alpha\tau/(\Phi_H \Phi_V) \quad \text{(Equation 4)}$$

Here, τ is the time interval of the BF-UE synchronization signal, α is the maximum elevation angle of the transmitting beam, $\Phi_H$ is the horizontal beam width of the BF-UE synchronization signal, and $\Phi_V$ is the vertical beam width of the BF-UE synchronization signal.

Also, when the beam transmitting direction is changed in elevation directions, the situation might occur where beams of the same width have different ranges (areas) of radiation, depending on the elevation angles of beams. That is, while the radiation area expands when the elevation angle is high (the angle α is large) (see the angle $\alpha_1$ shown in FIG. 5A), the radiation range narrows when the elevation angle is low (the angle α is small) (see the angle $\alpha_3$ shown in FIG. 5A). In these wide and narrow radiation areas, the power density decreases in the former case, and the power density increases in the latter case. The BF-UE synchronization signal transmission method according to the second example would make a preferable embodiment if parameters such as the beam width and the time interval are selected taking into account the above-noted phenomenon as well as the evenness and efficiency of the scan of BF-UE synchronization signals in the circular area around the mobile station UE. In this case, for example, by adjusting the beam width and the time interval depending on whether the elevation angle is high or the elevation angle is low, it is possible to make the total power of beams common, and secure the evenness of scan with BF-UE synchronization signals.

Note that the order of scan and the range of scan of transmitting beams can also be configured as parameters to be selected in the communication system. For example, FIG. 5B describes a case where, when the transmission direction of a transmitting beam is changed in an azimuthal direction, scan is executed from the same direction along the radial direction of the circular area around the mobile station UE. For example, when the transmission direction of a transmitting beam is changed in an azimuthal direction and the transmitting beam before the change is in the outer part in the circular area around the mobile station UE, the transmitting beam is transmitted outward, which is the same direction. However, the scanning order of transmitting beams is not limited this this, and can be changed as appropriate. For example, when the transmission direction of a transmitting beam is changed in an azimuthal direction, it is also possible to execute scan from a different direction along the radial direction of the circular area around the mobile station UE. For example, when the transmission direction of a transmitting beam is changed in an azimuthal direction and the transmitting beam before the change is in the outer part in the circular area around the mobile station UE, the transmitting beam may be transmitted inward, which is a different direction.

Also, FIG. 5B describes a case where all the directions in the circular area around the mobile station UE are in the scan range. However, the scan range of transmitting beams is not limited to this, and can be changed as appropriate. For example, it is possible scan only a certain area in the circular area around the mobile station UE with transmitting beams. Such selection of localized scanning ranges may be possible when, for example, the location of an MM base station MMeNB can be acquired in advance from the macro base station MeNB.

In this way, with the BF-UE synchronization signal transmission method according to the second example, as in the BF-UE synchronization signal transmission method according to the first example, the BF-UE synchronization signal is generated and transmitted by changing the beamforming weight every time interval τ, so that it is possible to allow the UE synchronization signal to travel to a massive-MIMO base station MMeNB that is located at a long distance from a mobile station UE. Meanwhile, since the BF-UE synchronization signal includes a UE-ID that is specific to the mobile station UE, the MM base station MMeNB can specify information related to the mobile station UE being the sender. By this means, the synchronization process can be carried out adequately in the MM base station MMeNB, so that it is possible to solve the defect in the cell search process and so on that arise from the fact that the MM base station MMeNB has no cell 1D.

Third Example

Next, the BF-UE synchronization signal transmission method according to a third example will be described. the BF-UE synchronization signal transmission method according to the third example is different from the BF-UE synchronization signal transmission method according to the second example in that the BF-UE synchronization signal is transmitted by combining a plurality of types of beams with varying beam widths. That is, the BF-UE synchronization signal transmission method according to the third example is a transmission method to scan all the MM base stations MMeNB that are located in all directions around a mobile station UE, by changing the transmission direction of multiple types of beams with varying beam widths for transmitting the BF-UE synchronization signal in azimuthal directions and in elevation directions every time interval τ. In the following description, differences from the BF-UE synchronization signal transmission method according to the second example will be primarily explained.

Figure 6A:
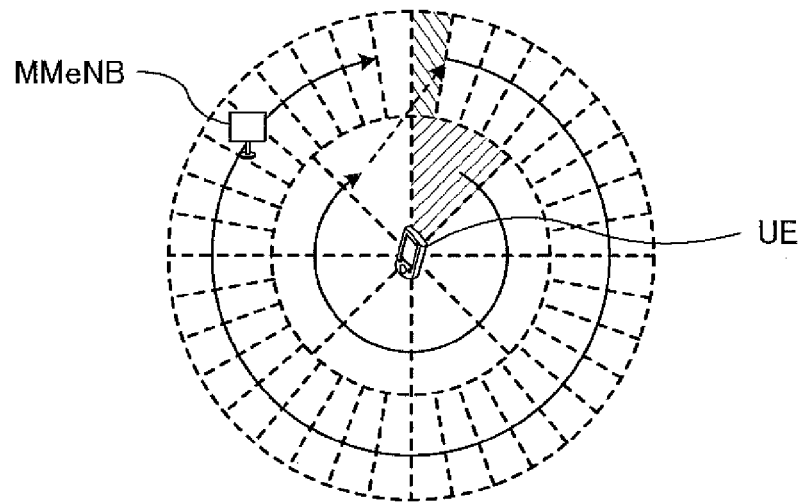
FIG. 6 provides diagrams to explain a BF-UE synchronization signal transmission method according to a third example.
Figure 6B:
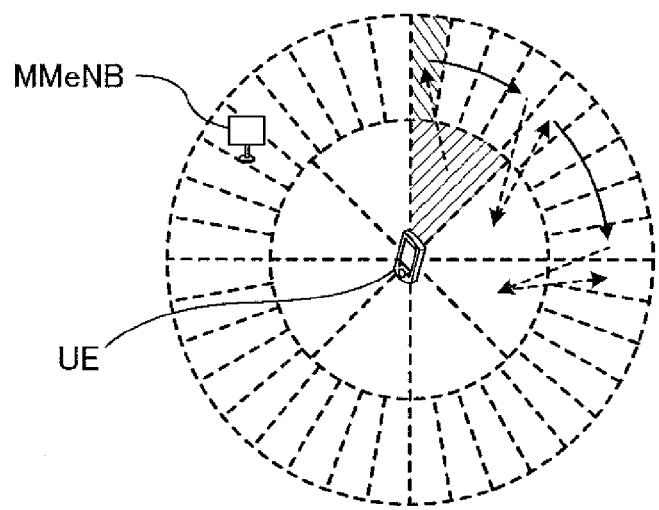

FIG. 6 provides diagrams to explain the BF-UE synchronization signal transmission method according to the third example. FIG. 6A and FIG. 6B show schematic images of transmission of BF-UE synchronization signals that are transmitted from a mobile station UE, near the subject station. FIG. 6A shows a case where an area at a short distance, included in a circular area, is scanned with a beam of a wide beam width, and where, next, an area at a long distance, included in the circular area, is scanned with a beam of a narrow beam width. FIG. 6B shows a case of repeating scanning the short distance area included in the circular area and scanning the long distance area corresponding to this short distance area, with a beam of a wide beam width. In either case illustrated in FIG. 6A and FIG. 6B, it is possible to improve the efficiency of scan in the circular area. In particular, FIG. 6A is suitable when scan is executed with a focus on the distance from the mobile station UE, and FIG. 6B is suitable when scan is executed with a focus on the direction seen from the mobile station UE.

Note that, in the above description, a case has been shown with the BF-UE synchronization signal transmission method according to the first example where the direction of transmission is changed only in azimuthal directions, and cases have been shown with the BF-UE synchronization signal transmission methods according to the second and third examples where the direction of transmission is changed in azimuthal directions and elevation directions. These BF-UE synchronization signal transmission methods according to the first to third examples can be combined as well. Here, for ease of explanation, the scan mode of the BF-UE synchronization signal transmission method according to the first example will be referred to as the "two-dimensional (2D) scan mode," and the scan mode of the BF-UE synchronization signal transmission methods according to the second and third examples will be referred to as the "three-dimensional (3D) scan mode."

These scan modes can be configured as parameters to be selected in the communication system. For example, it is possible to select the 3D scan mode when the circular area around a mobile station UE is relatively large, while selecting the 2D scan mode when the circular area around a mobile station UE is relatively small. Also, if the circular area around a mobile station UE can be covered by a beam having a wide beam width in the vertical plane, the 2D scan mode can be selected. Also, when, for example, the location of an MM base station MMeNB can be acquired in advance from the macro base station MeNB, it is possible to switch between the 2D scan mode and the 3D scan mode dynamically, depending on the communication environment such as the situation regarding the placement of MM base stations MMeNB.

For example, these scan modes can be switched by selecting between BF weights to control the transmission direction of the BF-UE synchronization signal in azimuthal directions, and BF weights to control the transmission direction of the BF-UE synchronization signal in azimuthal directions and elevation directions. Since the 2D scan mode and the 3D scan mode can be switched by selecting BF weights in this way, it is possible to switch the synchronization signal that is required in the cell search process, flexibly, without requiring complex control.

Figure 7:
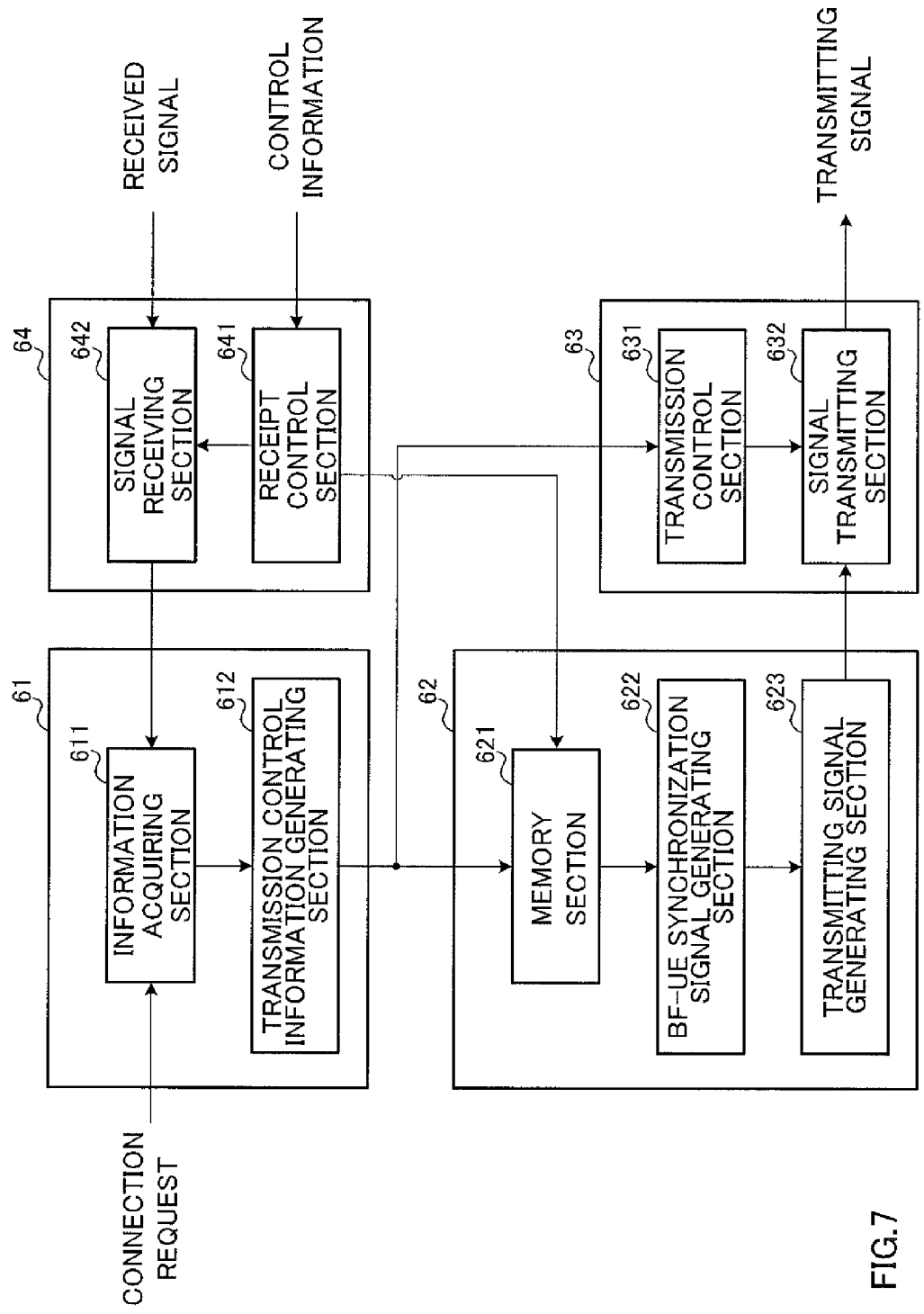
FIG. 7 is a block diagram to explain an example structure of a mobile station apparatus for use in the synchronization method according to the present embodiment.
Figure 8:
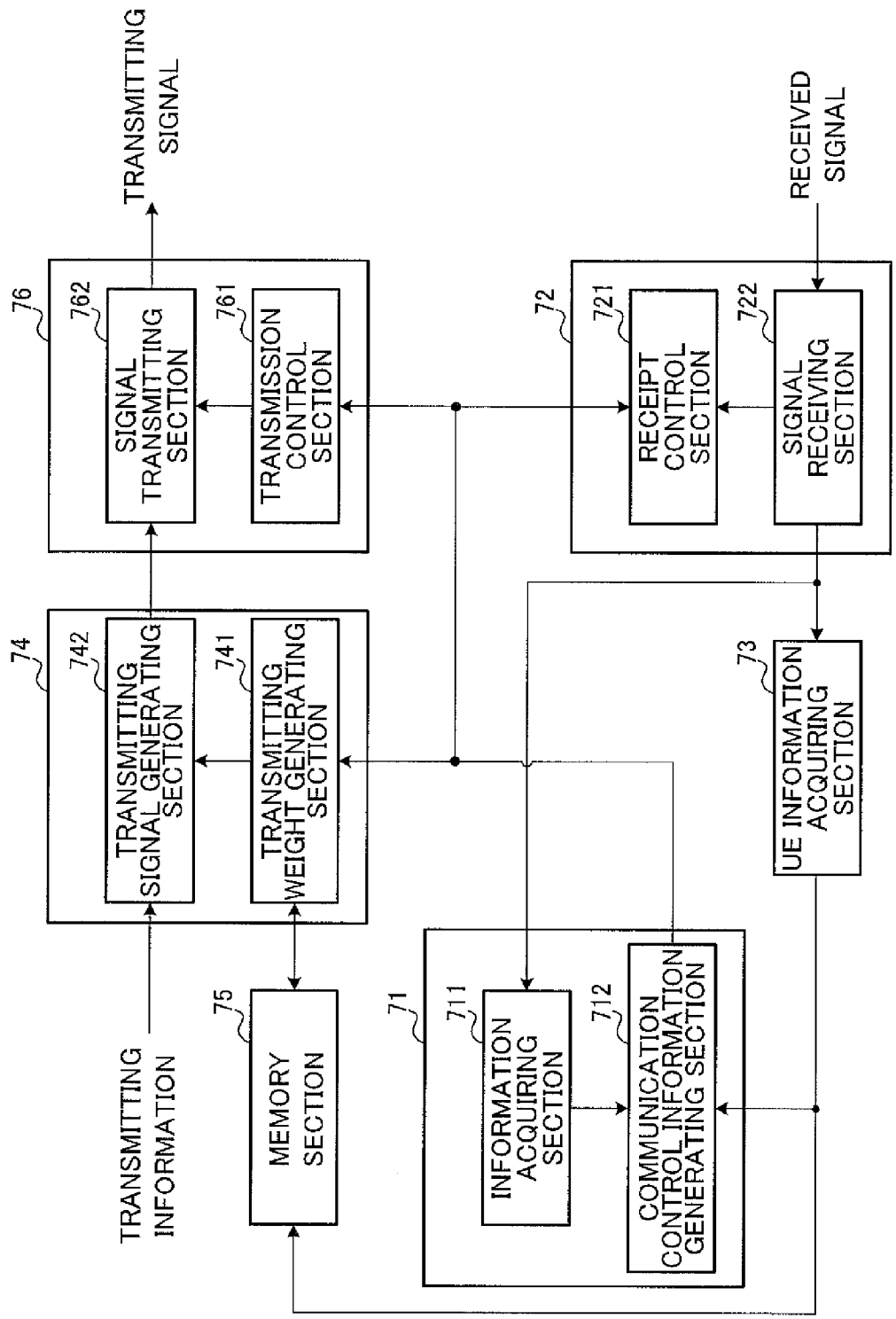
FIG. 8 is a block diagram to explain an example structure of a massive-MIMO base station apparatus for use in the synchronization method according to the present embodiment.

Next, examples of the structures of a mobile station UE and an MM base station MMeNB for use in the synchronization method according to the present embodiment will be described. FIG. 7 is a block diagram to explain an example structure of a mobile station UE for use in the synchronization method according to the present embodiment. FIG. 8 is a block diagram to explain an example structure of an MM base station MMeNB for use in the synchronization method according to the present embodiment. Note that the structures of the mobile station UE and the MM base station MMeNB shown in FIG. 7 and FIG. 8 are simplified in order to explain the present invention, but have structures which a normal mobile station apparatus and base station apparatus should have. In particular, in the mobile station UE shown in FIG. 7, components pertaining to data communication are omitted.

As shown in FIG. 7, the mobile station UE is comprised of a control information processing section 61, a UE synchronization signal processing section 62, which constitutes a synchronization signal processing section, a transmitting section 63 and a receiving section 64. The control information processing section 61 includes an information acquiring section 611 and a transmission control information generating section 612. The UE synchronization signal processing section 62 has a memory section 621, a BF-UE synchronization signal generating section 622 and a transmitting signal generating section 623. The transmitting section 63 has a transmission control section 631 and a signal transmitting section 632. The receiving section 64 has a receipt control section 641 and a signal receiving section 642.

The control information processing section 61 generates transmission control information based on a connection request from an unillustrated application processing section, control information from the macro base station MeNB (the above-noted mobile station control information) and so on, and outputs the generated transmission control information to the UE synchronization signal processing section 62 and the transmitting section 63. The information acquiring section 611 acquires the connection request from the application processing section, and, furthermore, acquires the control information included in receiving signals that arrive from the macro base station MeNB. Then, the information acquiring section 611 outputs the acquired connection request and control information to the transmission control information generating section 612. The transmission control information generating section 612 generates transmission control information based on the connection request and control information received from the information acquiring section 611. This transmission control information includes, for example, information related to a connection request signal for requesting the macro base station MeNB to connect with the MM base station MMeNB, and the control information received from the macro base station MeNB. The information related to the connection request signal, includes, for example, the UE-ID. The control information includes, for example, whether or not there is an MM base station MMeNB, its location information and so on. The transmission control information generating section 612 outputs the generated transmission control information to the memory section 621 of the UE synchronization signal processing section 62 and the transmission control section 631 of the transmitting section 63.

The UE synchronization signal processing section 62 generates the BF-UE synchronization signal and transmitting signal based on the transmission control information received from the control information processing section 61 (to be more specific, the control information from the macro base station MeNB). The memory section 621 has a database that memorizes transmission control information and BF weights. In this database, for example, the transmission control information received from the control information processing section 61, and BF weights that are determined in advance to transmit signals in each direction around the mobile station UE are stored. The BF-UE synchronization signal generating section 622 generates the BF-UE synchronization signal based on information stored in the memory section 621 (database). Then, the BF-UE synchronization signal generating section 622 outputs the generated BF-UE synchronization signal to the transmitting signal generating section 623. The transmitting signal generating section 623 generates a transmitting signal including this BF-UE synchronization signal. Then, the transmitting signal generating section 623 outputs the generated transmitting signal to the transmitting section 63.

The transmitting section 63 transmits a connection request signal to the macro base station MeNB based on the transmission control information received from the control information processing section 61 (to be more specific, the information related to the connection request signal). The transmitting section 63 and the transmission control information generating section 612 constitute a connection request transmitting section. Also, the transmitting section 63 transmits the transmitting signal received from the UE synchronization signal processing section 62, near the mobile station UE. The transmission control section 631 controls the signal transmission by the signal transmitting section 632 based on the transmission control information received from the control information processing section 61. To be more specific, the transmission control section 631 controls the transmission of the connection request signal in accordance with the information related to the connection request signal, and also controls the transmission of the transmitting signal including the BF-UE synchronization signal. Under the control of the transmission control section 631, the signal transmitting section 632 transmits the connection request signal to the macro base station MeNB, and, meanwhile, transmits the transmitting signal including the BF-UE synchronization signal near the mobile station UE.

The receiving section 64 receives control information from the macro base station MeNB (the above-noted mobile station control information), and receives a receiving signal from the MM base station MMeNB. The receipt control section 641 constitutes a control information receiving section, and receives the control information from the macro base station MeNB. The receipt control section 641 controls the receipt of signals in the signal receiving section 642 based on the control information received. Under the control of the receipt control section 641, the signal receiving section 642 receives a receiving signal (BF signal) that arrives from the MM base station MMeNB. The signal receiving section 642 outputs the received signal from the MM base station MMeNB, to an unillustrated application processing section. This application processing section performs processes that are necessary to decode received signals and so on. Also, the signal receiving section 642 outputs the control information received in the receipt control section 641 to the control information processing section 61.

Meanwhile, as shown in FIG. 8, the MM base station MMeNB is comprised of a control information processing section 71, a receiving section 72, a UE information acquiring section 73, which constitutes an acquiring section, a transmitting signal processing section 74, a memory section 75 and a transmitting section 76. The control information processing section 71 has an information acquiring section 711 and a communication control information generating section 712. The receiving section 72 has a receipt control section 721 and a signal receiving section 722. The transmitting signal processing section 74 has a transmitting weight generating section 741 and a transmitting signal generating section 742. The transmitting section 76 has a transmission control section 761 and a signal transmitting section 762.

The control information processing section 71 generates communication control information based on the control information from the macro base station MeNB, and outputs this communication control information to the receiving section 72, the transmitting signal processing section 74 and the transmitting section 76. The information acquiring section 711 acquires control information from the macro base station MeNB (the above-noted MM base station control information). This control information includes, for example, whether or not there is a mobile station UE that desires communication, its UE-ID, location information and so on. Then, the information acquiring section 711 outputs the acquired control information to the communication control information generating section 712. The communication control information generating section 712 generates communication control information based on the control information received from the information acquiring section 711 and UE information from the UE information acquiring section 73. Then, the communication control information generating section 712 outputs the communication control information to the receipt control section 721 in the receiving section 72, the transmitting weight generating section 741 in the transmitting signal processing section 74 and the transmission control section 761 in the transmitting section 76. This communication control information includes control information for receiving signals in the receiving section 72 (receipt control information), control information for generating transmitting weights in the transmitting signal processing section 74 (weight control information), and control information for transmitting signals from the transmitting section 76 (transmission control information).

The receiving section 72 receives control information from the macro base station MeNB (MM base station control information), and, furthermore, receives the BF-UE synchronization signal from the mobile station UE. The receipt control section 721 controls the receipt of signals in the signal receiving section 722, based on the receipt control information received from the control information processing section 71. The signal receiving section 722 constitutes a control information receiving section, and, under the control of the receipt control section 721, receives receiving signals from the macro base station MeNB and the mobile station UE. The received signal from the macro base station MeNB includes control information (MM base station control information). The received signal from the mobile station UE includes the BF-UE synchronization signal. The signal receiving section 722 outputs the MM base station control information to the receipt control section 721, the information acquiring section 711 of the control information processing section 71 and the UE information acquiring section 73.

The UE information acquiring section 73 acquires information related to the mobile station UE (UE information) from the MM base station control information received from the signal receiving section 722. This UE information includes the mobile station UE's UE-ID and location information. Then, the UE information acquiring section 73 outputs the acquired UE information to the communication control information generating section 712 of the control information processing section 71, and the memory section 75. The UE information that is input in the communication control information generating section 712 is used to generate communication control information in the communication control information generating section 712. Meanwhile, the UE information that is input in the memory section 75 is used to generate transmitting weights in the transmitting weight generating section 741.

The transmitting signal processing section 74 generates a transmitting signal (BF signal) based on weight control information from the control information processing section 71. The transmitting weight generating section 741 generates a transmitting weight in accordance with the weight control information received from the control information processing section 71 and a BF weight memorized in the memory section 75. Then, the transmitting weight generating section 741 outputs the generated transmitting weight to the transmitting signal generating section 742. From transmission information that is received from a higher layer, the transmitting signal generating section 742 generates a transmitting signal (BF signal) based on the transmitting weight from the transmitting weight generating section 741. Then, the transmitting signal generating section 742 outputs the generated transmitting signal to the signal transmitting section 762 of the transmitting section 76.

The memory section 75 has a database that memorizes UE information, transmitting weights to use when generating transmitting signals, and so on. In this database, for example, UE information that is received from the UE information acquiring section 73, transmitting weights that are determined in advance in order to transmit signals in every direction around the MM base station MMeNB, and transmitting weights that are generated in the transmitting weight generating section 741 are stored.

The transmitting section 76 transmits the transmitting signal (BF signal) to the mobile station UE based on the transmission control information from the control information processing section 71. The transmission control section 761 controls the signal transmission by the signal transmitting section 762 based on the transmission control information received from the control information processing section 71. Under the control of the transmission control section 761, the signal transmitting section 762 transmits the transmitting signal (BF signal) received from the transmitting signal processing section 74, to the mobile station UE.

Figure 9:
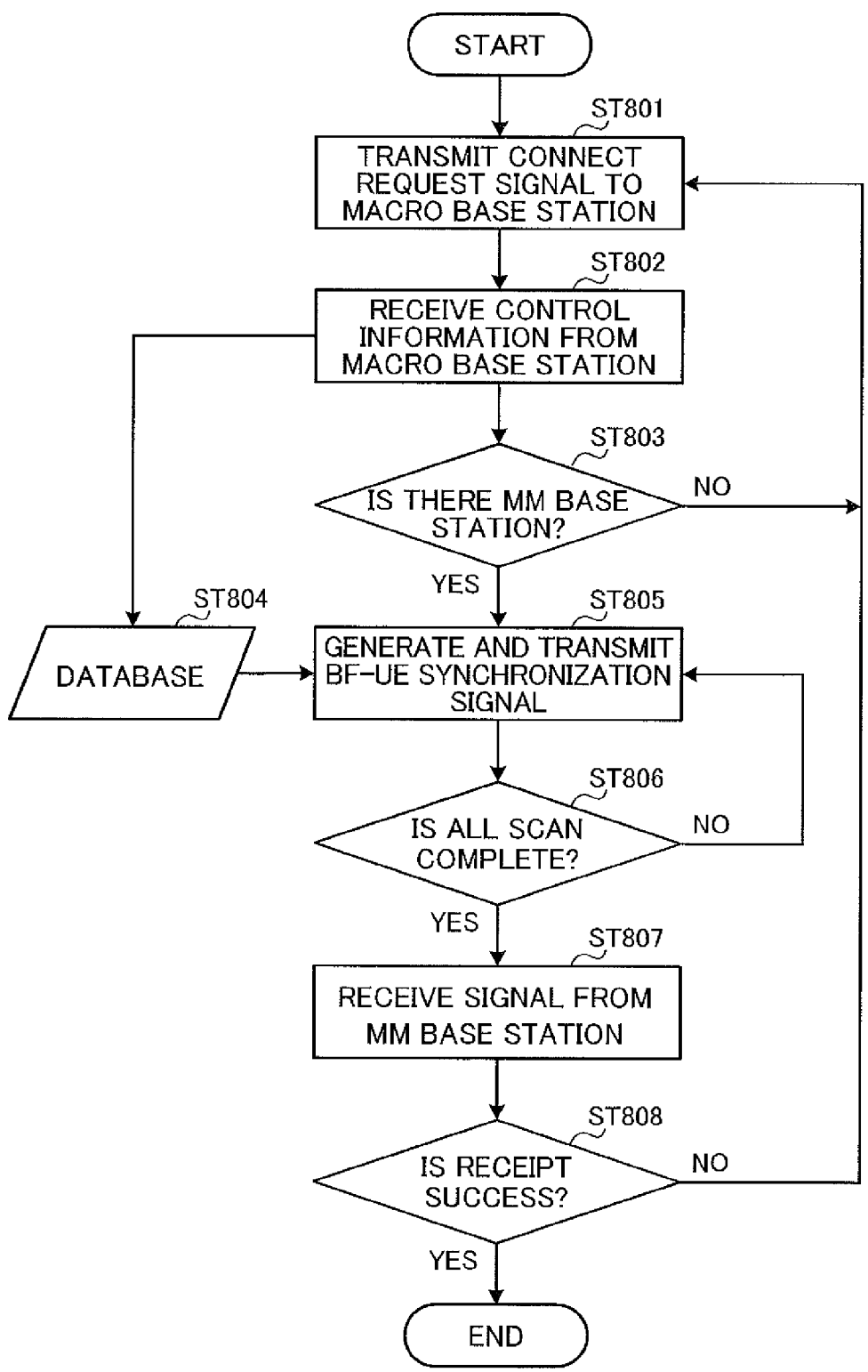
FIG. 9 is a flowchart to explain the operation of a mobile station apparatus which employs the synchronization method according to the present embodiment.
Figure 10:
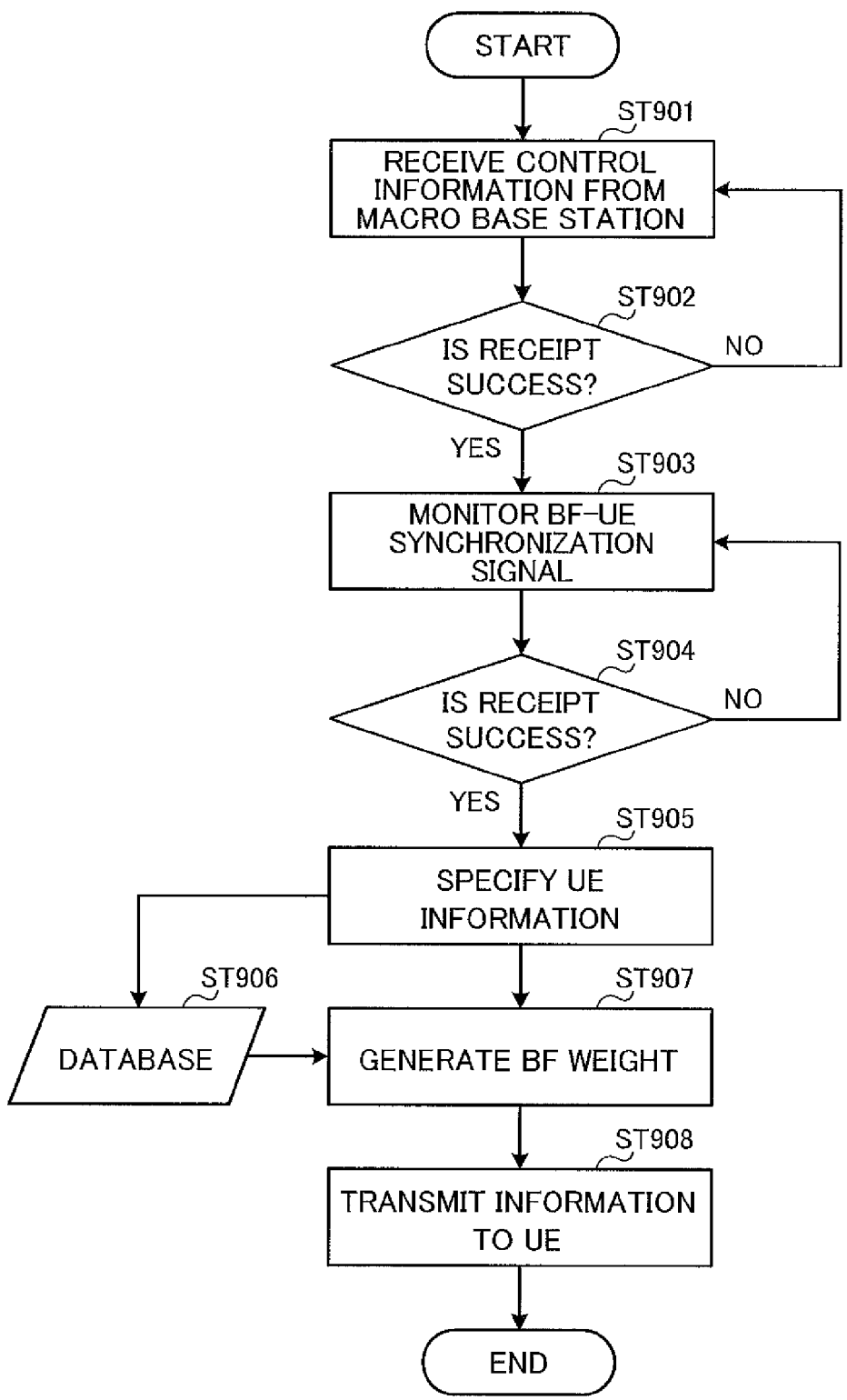
FIG. 10 is a flowchart to explain the operation of a massive-MIMO base station apparatus which employs the synchronization method according to the present embodiment.

Next, the operations of these mobile station UE and MM base station MMeNB will be described. FIG. 9 is a flowchart to explain the operation of the mobile station UE in which the synchronization method according to the present embodiment is employed. FIG. 10 is a flowchart to explain the operation of the MM base station MMeNB in which the synchronization method according to the present embodiment is employed. Note that a case will be illustrated in the following description where, when high speed communication becomes necessary in the mobile station UE, a connection request signal is triggered to be transmitted from the mobile station UE to the macro base station MeNB. However, the trigger for transmission of the connection request signal is by no means limited to this.

When high speed communication becomes necessary in the mobile station UE, the information acquiring section 611 of the control information processing section 61 receives a connection request from an unillustrated application processing section. Upon receiving the connection request, the transmission control information generating section 612 generates transmission control information for the connection request signal, and outputs this to the transmitting section 63. The signal transmitting section 632 of the transmitting section 63 transmits the connection request signal to the macro base station MeNB under the control of the transmission control section 631 (ST801). This connection request signal includes the UE-ID.

After transmitting the connection request signal, the receipt control section 641 of the receiving section 64 monitors the receipt of control information from the macro base station MeNB (the above-noted mobile station control information). Upon receiving control information from the macro base station MeNB (ST802), the receipt control section 641 decides whether or not there is an MM base station MMeNB around the subject station based on this control information (ST803). Also, the receipt control section 641 outputs the received control information to the memory section 621 of the UE synchronization signal processing section 62. The memory section 621, upon receiving the control information from the receipt control section 641, stores this control information in the database (ST804).

Referring to the decision in ST803, if no MM base station MMeNB is present, the mobile station UE returns to the process of ST801, and performs the processes of ST801 to ST804 again. On the other hand, if there is an MM base station MMeNB, the mobile station UE generates the BF-UE synchronization signal in the BF-UE synchronization signal generating section 622 of the UE synchronization signal processing section 62, and, furthermore, transmits the BF-UE synchronization signal via the signal transmitting section 632 of the transmitting section 63 (ST805). Note that this BF-UE synchronization signal is generated and transmitted in accordance with, for example, the above-described BF-UE synchronization signal transmission methods according to the first and second examples.

After transmitting the BF-UE synchronization signal, the BF-UE synchronization signal generating section 622 decides whether the BF-UE synchronization signal has been transmitted in all directions. That is, the BF-UE synchronization signal generating section 622 decides whether scan is complete in all directions around the mobile station UE (ST806). If scan is not complete in all directions around the mobile station UE, the BF-UE synchronization signal generating section 622 returns to the process of ST805, and repeats the operations of generating and transmitting the BF-UE synchronization signal.

On the other hand, if scan is complete in all directions around the mobile station UE, the receipt control section 641 monitors the receipt of signals from the MM base station MMeNB. Then, when signals are received from the MM base station MMeNB (ST807), the BF-UE synchronization signal generating section 622 decides whether or not all signals have been received successfully (ST808). If not all signals have been received successfully, the mobile station UE returns to the process of ST801, and performs the processes of ST801 to ST808 again. On the other hand, if all signals have been received successfully, the mobile station UE finishes the series of processes.

In this way, the mobile station UE according to the present embodiment generates and transmits the BF-UE synchronization signal by changing the BF weight every predetermined time interval, so that it is possible to allow the BF-UE synchronization signal to travel to an MM base station MMeNB that is located at a long distance from the mobile station UE. Meanwhile, since the BF-UE synchronization signal includes the mobile station UE's UE-ID, the MM base station MMeNB can specify information related to the mobile station UE being the sender. By this means, the synchronization process can be carried out adequately in the MM base station MMeNB, so that it is possible to solve the defect in the cell search process and so on that arise from the fact that the MM base station MMeNB has no base station ID.

Note that a case has been illustrated with the above description where the mobile station UE receives signals from the MM base station MMeNB when the mobile station UE has transmitted the BF-UE synchronization signal in all directions around the subject station (when scan is complete in all directions). However, the transmission of the BF-UE synchronization signal from the mobile station UE and the receipt of signals from the MM base station MMeNB are not limited to these, and can be changed as appropriate. For example, it is equally possible to receive signals from the MM base station MMeNB without waiting until the transmission of BF-UE synchronization signals is complete in all directions around the mobile station UE.

Also, regarding the BF-UE synchronization signal, it is preferable to control the direction of transmission (range of transmission) in accordance with control information from the macro base station MeNB and/or others (the above-noted mobile station control information). In this case, it is possible to reduce the load of the BF-UE synchronization signal transmission process in the mobile station UE, and reduce the power consumption.

As an example of controlling the range of transmission, for example, it is possible to control the transmission direction of the BF-UE synchronization signal by using BF weights to match location information of the MM base station MMeNB that is included in the control information from the macro base station MeNB. In particular, it is preferable to predict location information of the MM base station MMeNB by using information acquired from electronic compass, GPS and gyro sensors and so on mounted on the mobile station UE, and transmit the BF-UE synchronization signal only in a specific direction based on the predicted result.

Also, it may be possible to attach priority information regarding the transmission direction of the BF-UE synchronization signal, to the control information from the macro base station MeNB and/or others. For example, when there are a plurality of MM base stations MMeNB around the mobile station UE and every MM base station MMeNB has a varying distance from the mobile station UE, the transmission direction of the BF-UE synchronization signal for an MM base station MMeNB at a short distance from the mobile station UE is assigned information to indicate high priority. In this case, the mobile station UE may control the transmission direction of the BF-UE synchronization signal by using a BF weight to match that priority information. In this case, for example, it becomes possible to select the MM base station MMeNB at the shortest distance from the mobile station UE and transmit the BF-UE synchronization signal, and therefore communicate with the MM base station MMeNB that is the most suitable for high speed communication and so on.

Furthermore, also, if information (for example, location information) related to other mobile stations UE located around the mobile station UE is included in control information from the macro base station MeNB and/or others, the mobile station UE may control the transmission direction of BF-UE synchronization signals by using BF weights that reduce the interference against the other mobile stations UE. In this case, the interference against the other mobile stations UE can be reduced, so that becomes possible to prevent the decrease of communication quality in the other mobile stations UE, and improve the throughput performance of the communication system as a whole.

Furthermore, it may also be possible to keep record of actual transmission results of the BF-UE synchronization signal in the past, predict the present location information and the positional relationship with the MM base station MMeNB, and transmit the BF-UE synchronization signal. To predict the present location information and the positional relationship with the MM base station MMeNB, for example, it is possible to use information acquired from electronic compass, GPS and gyro sensors and so on mounted on the mobile station UE. In this case, for example, under certain conditions such as when there are actual results of BF-UE synchronization signal transmission, it is possible to transmit the BF-UE synchronization signal in specific directions, without receiving control information from the macro base station MeNB and/or others. As a result of this, it is possible to skip communication control with respect to the macro base station MeNB, and, furthermore, reduce the load of the BF-UE synchronization signal transmission process in the mobile station UE.

On the other hand, in the MM base station MMeNB, during the idle state, the receipt control section 721 monitors the receipt of control information from the macro base station MeNB (the above-noted MM base station control information). Then, upon receiving control information from the macro base station MeNB (ST901), the receipt control section 721 decides whether all control information has been received successfully (ST902). Here, if all of the control information has not been received yet, the receipt control section 721 returns to the process of ST901, and performs the process of ST901 again.

In ST902, if all control information has been received, the receipt control section 721 monitors the receipt of BF-UE synchronization signals from the mobile station UE (ST903). Then, upon receiving BF-UE synchronization signals from the mobile station UE, the receipt control section 721 decides whether all the BF-UE synchronization signals have been received successfully (ST904). Here, if all the BF-UE synchronization signals have not been received, the receipt control section 721 returns to the process of ST903, and performs the process of ST903 again.

If all the BF-UE synchronization signals have been received, the UE information acquiring section 73 specifies UE information from the BF-UE synchronization signals (ST905). By this means, the mobile station UE's UE-ID, location information and so on are specified. By using the mobile station UE's UE-ID, location information and so on specified thus, the MM base station MMeNB can perform the synchronization process adequately. The UE information acquiring section 73 outputs the acquired UE information to the communication control information generating section 712 and the memory section 75. In the communication control information generating section 712, the communication control information that is generated based on the UE information is output to the transmitting weight generating section 741 in the transmitting signal processing section 74. The UE information that is input in the memory section 75 is stored in the database (ST906).

Upon receiving communication control information (to be more specific, weight control information), the transmitting weight generating section 741 generates a transmitting weight (BF weight) based on the UE information stored in the memory section 75 (database) (ST907). Based on this transmitting weight, transmitting signals (BF signals) generated in the transmitting signal generating section 742 is output to the transmitting section 76.

Under the control of the transmission control section 761, the signal transmitting section 762 in the transmitting section 76 transmits the transmitting signals (BF signals) to the mobile station UE (ST908). Then, when all the transmitting signals (BF signals) have been transmitted to the mobile station UE, the MM base station MMeNB finishes the series of processes.

In this way, the MM base station MMeNB according to the present embodiment receives BF-UE synchronization signals that include the UE-ID of the mobile station UE, and acquires UE information (terminal information) from the BF-UE synchronization signals. Then, since the transmission direction of transmitting signals is controlled by using BF weights to match the UE information, it is possible to transmit transmitting signals (BF signals) adequately even when the mobile station UE is located at a long distance from the MM base station MMeNB.

Note that a case has been shown in the above description where, after control information is received from the macro base station MeNB and/or others, the receipt of BF-UE synchronization signals is monitored without executing special control. However, if the control information from the macro base station MeNB and/or others includes location information of the mobile station UE, controlling the receiving direction of BF-UE synchronization signals by using receiving weights to match that location information would make a preferable embodiment (which is commonly referred as to "receiving beamforming). In this case, the time the MM base station MMeNB monitors BF-UE synchronization signals can be shortened, so that it is possible to reduce the time until BF signals are transmitted to the mobile station UE.

In particular, when the control information from the macro base station MeNB and/or others includes the transmission timing of BF-UE synchronization signals in the mobile station UE, it is preferable to execute receiving beamforming in accordance with that transmission timing. In this case, it is possible to reduce the power consumption the MM base station MMeNB requires to monitor BF-UE synchronization signals.

Also, as for the monitoring of BF-UE synchronization signals, the macro base station MeNB and/or others may configure control information so that a specific range is monitored. For example, it may be possible to configure location information and/or priority information to specify a specific monitoring range, in control information. In this case, the macro base station MeNB and/or others can control the monitoring range of BF-UE synchronization signals in the MM base station MMeNB, so that, for example, even when a plurality of MM base stations MMeNB are arranged close to each other, it is still possible to improve the received quality of BF-UE synchronization signals in each MM base station MMeNB.

The present invention is by no means limited to the above embodiment and can be implemented with various changes. For example, it is possible to change the method of transmitting BF-UE synchronization signals, the number of processing sections in the mobile station UE or the MM base station MMeNB and the order of processes in the above description, as appropriate, and still implement the present invention, without departing from the scope of the present invention. Besides, the present invention can be implemented with various changes, without departing from the scope of the present invention.

The disclosure of Japanese Patent Application No. 2013-185658, filed on Sep. 6, 2013, including the specification, drawings and abstract, is incorporated herein by reference in its entirety.

The invention claimed is:

1. A synchronization method for transmitting a synchronization signal by controlling a transmission direction of a transmitting beam for the synchronization signal by means of beamforming using a plurality of antenna elements provided in a mobile station apparatus, the synchronization method comprising:
   a synchronization signal processing step of generating the synchronization signal including identification information of the mobile station apparatus, and changing a beamforming weight for the synchronization signal at predetermined time intervals; and
   a transmitting step of transmitting the synchronization signal generated in accordance with each beamforming weight on uplink.

2. The synchronization method according to claim 1, further comprising:
   a connection request step of transmitting, from the mobile station apparatus, a connection request signal for requesting a communication apparatus that manages control information, including whether or not there is a base station apparatus located around the mobile station apparatus, to connect with the base station apparatus; and
   a control information receiving step of receiving in the mobile station apparatus the control information from the communication apparatus,
   wherein, in the synchronization signal processing step, when information to indicate the presence of the base station apparatus has been included in the control information received from the communication apparatus, the synchronization signal is generated, and the beamforming weight for the synchronization signal is changed at predetermined time intervals.

3. The synchronization method according to claim 2, wherein, when the information to indicate the presence of the base station apparatus is not included in the control information received from the communication apparatus, the connection request step and the control information receiving step are repeated.

4. The synchronization method according to claim 2, wherein, in the synchronization signal processing step, when location information of the base station apparatus has been included in the control information received from the communication apparatus, the transmission direction of the synchronization signal is controlled by using a beamforming weight to match the location information of the base station apparatus.

5. The synchronization method according to claim 2, wherein, in the synchronization signal processing step, when priority information regarding the transmission direction of the synchronization signal has been included in the control information received from the communication apparatus, the transmission direction of the synchronization signal is controlled by using a beamforming weight to match the priority information.

6. A mobile station apparatus that transmits a synchronization signal by controlling a transmission direction of a transmitting beam for the synchronization signal by means of beamforming using a plurality of antenna elements, the mobile station apparatus comprising:
   a processor configured to generate the synchronization signal including identification information of the mobile station apparatus, and to change a beamforming weight for the synchronization signal at predetermined time intervals; and
   a transmitter that transmits the synchronization signal generated in accordance with each beamforming weight on uplink.

7. The mobile station apparatus according to claim 6, wherein
   the transmitter further transmits a connection request signal for requesting a communication apparatus that manages control information, including whether or not there is a base station apparatus located around the mobile station apparatus, to connect with the base station apparatus; and the mobile station apparatus further comprising:
   a receiver that receives the control information from the communication apparatus,
   wherein, when information to indicate the presence of the base station apparatus has been included in the control information received from the communication apparatus, the processor generates the synchronization signal, and changes the beamforming weight for the synchronization signal at predetermined time intervals.

8. The mobile station apparatus according to claim 7, wherein, when the information to indicate the presence of the base station apparatus is not included in the control information received from the communication apparatus, the transmission of the connection request signal by the transmitter and the receipt of the control information by the receiver are repeated.

9. A base station apparatus that transmits a transmitting signal by controlling a transmission direction of a transmitting beam by means of beamforming using a plurality of antenna elements, the base station apparatus comprising:
- a receiver that receives a synchronization signal including identification information of a mobile station apparatus;
- a processor configured to acquire terminal information, including the identification information of the mobile station apparatus, from the synchronization signal; and
- a transmitter that controls the transmission direction of the transmitting signal by using a beamforming weight to match the terminal information.

10. The base station apparatus according to claim 9, wherein the receiver further receives control information from a communication apparatus that manages the control information, including location information of a mobile station apparatus that is located around the base station apparatus, and
- wherein the receiver controls a receiving direction of the synchronization signal by using a receiving weight to match the location information of the mobile station apparatus included in the control information.

* * * * *